United States Patent [19]
Akagawa et al.

[11] Patent Number: 5,219,215
[45] Date of Patent: Jun. 15, 1993

[54] MODULAR CLEAN BENCH SYSTEM

[75] Inventors: Minoru Akagawa, Fremont; Mark A. Lykam, San Joise, both of Calif.

[73] Assignee: Intelmatec Corporation, Fremont, Calif.

[21] Appl. No.: 801,941

[22] Filed: Dec. 3, 1991

[51] Int. Cl.⁵ .............................................. C12K 1/10
[52] U.S. Cl. ...................................................... 312/1
[58] Field of Search .................. 312/1, 236, 296, 223, 312/198, 199

[56] References Cited
U.S. PATENT DOCUMENTS
4,111,753 9/1978 Folsom et al. .................. 312/1 X Primary Examiner—Peter R. Brown
Attorney, Agent, or Firm—Heller, Ehrman, White, McAuliffe

[57] ABSTRACT

Clean benches each providing a sealed work space can be connected together in a row to form a modular system such that objects on pallets can be transported concurrently back and forth from one to another of connected benches through sealed doorways. The pallets have a translucent bottom and lamps are provided below their paths such that the objects thereon can be clearly silhouetted. Each bench is provided with a driving mechanism for a robotic gripper arm such that various tools can be used to automatically perform different tasks in the work space. The main frame of each bench forms a closed air circulating system for providing an air flow through the work space, and fans of different power are arranged in its path such that the air pressure tends to be higher in the work space than elsewhere.

20 Claims, 5 Drawing Sheets

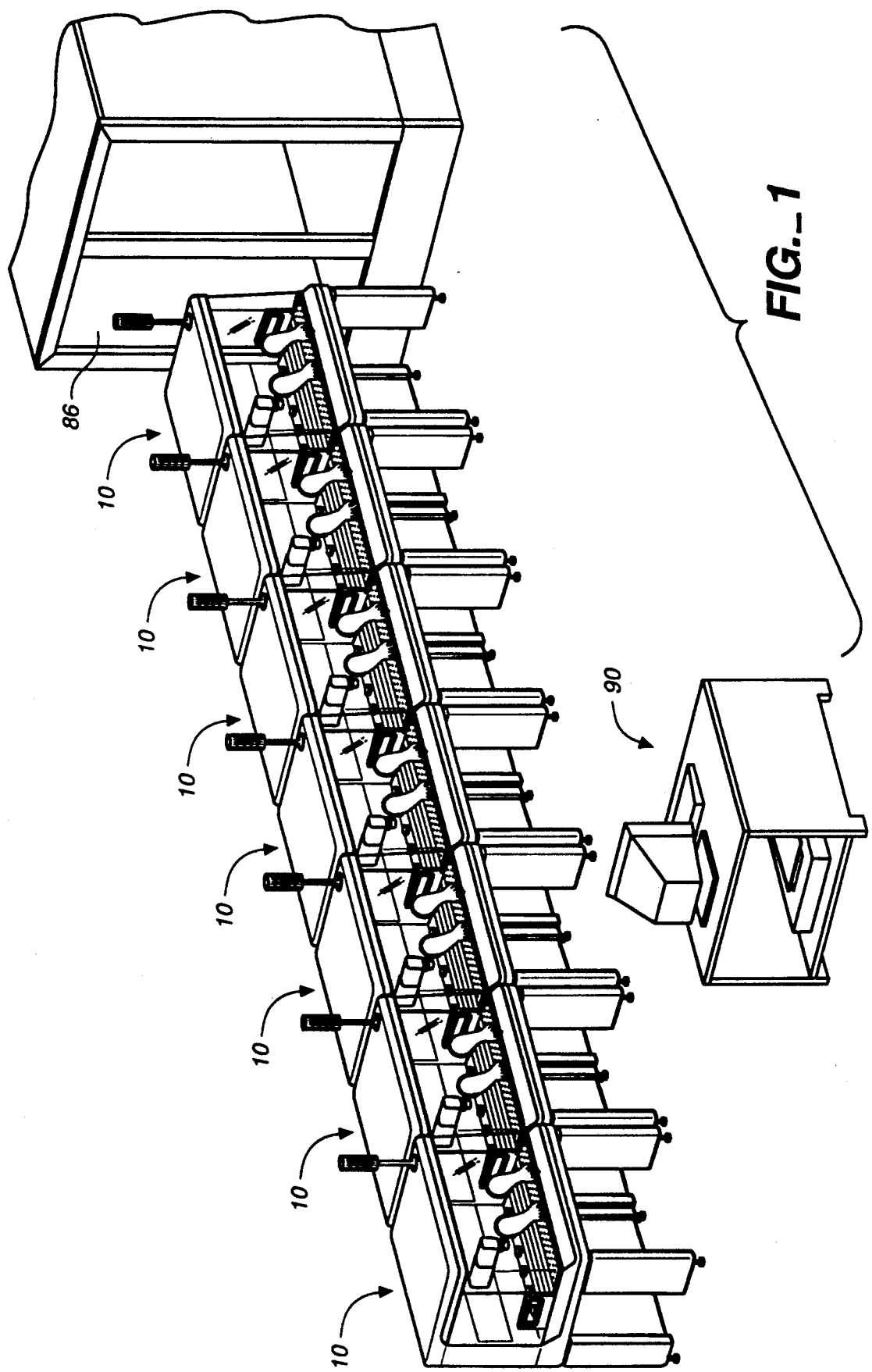
FIG._1

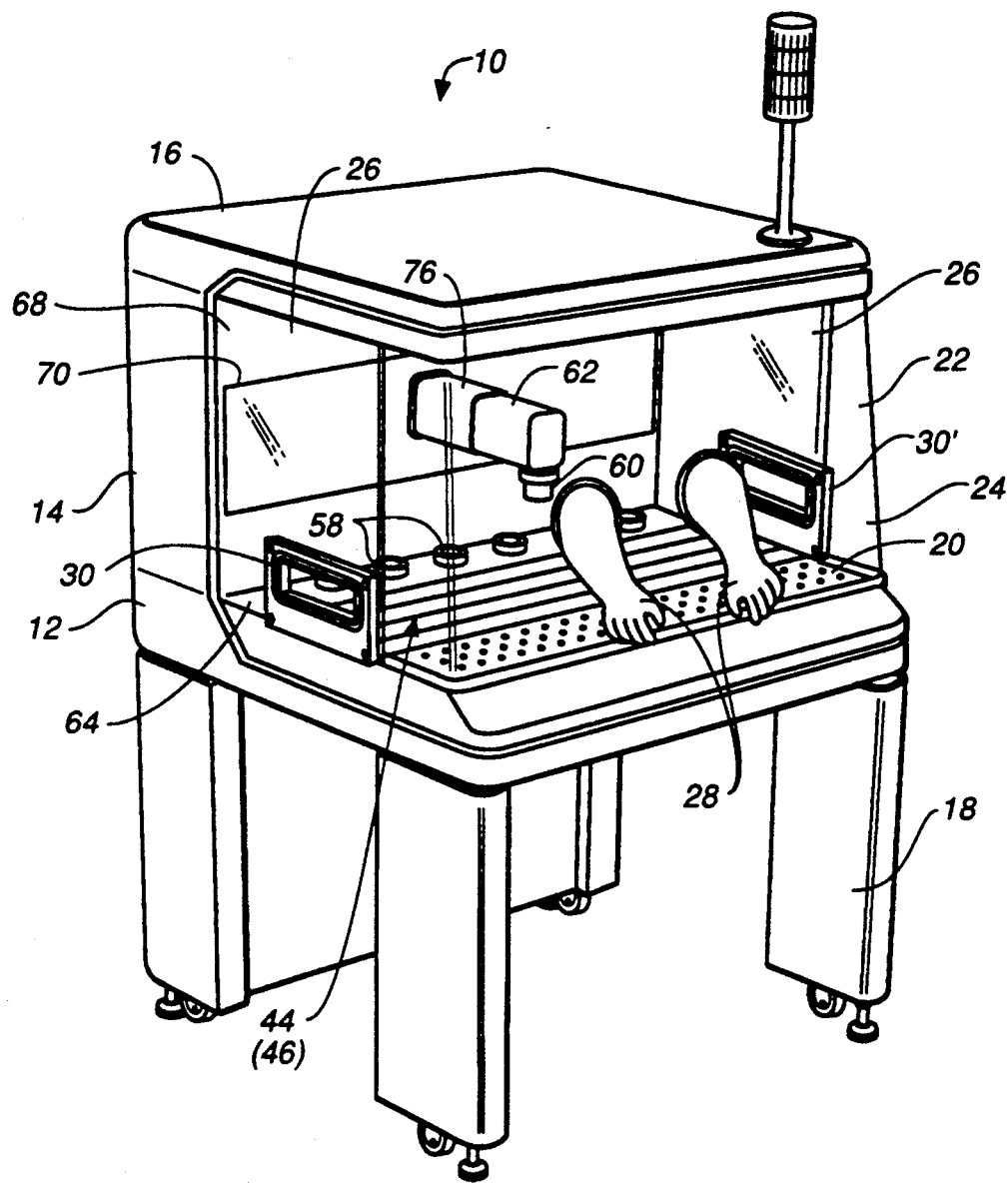
FIG._2

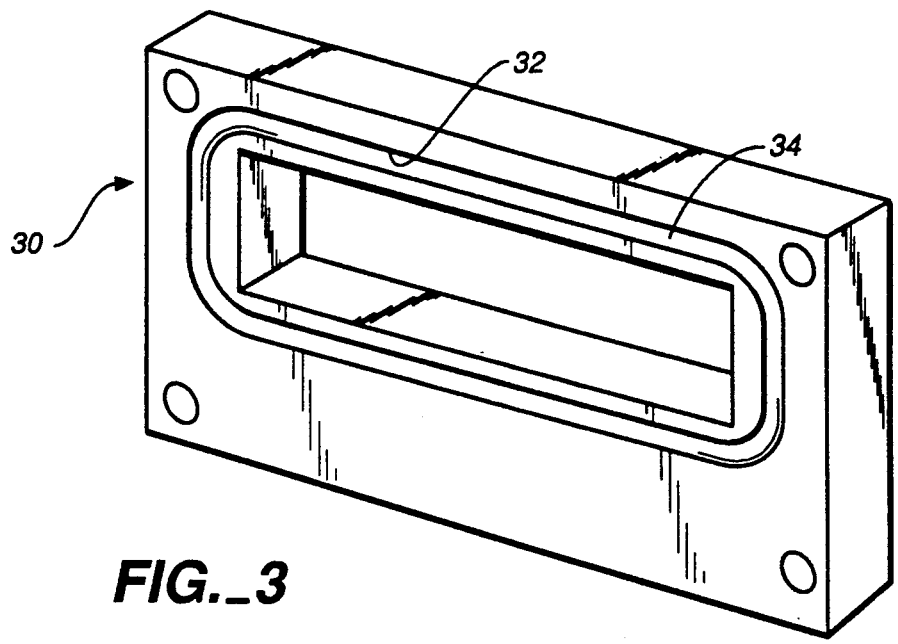
FIG._3
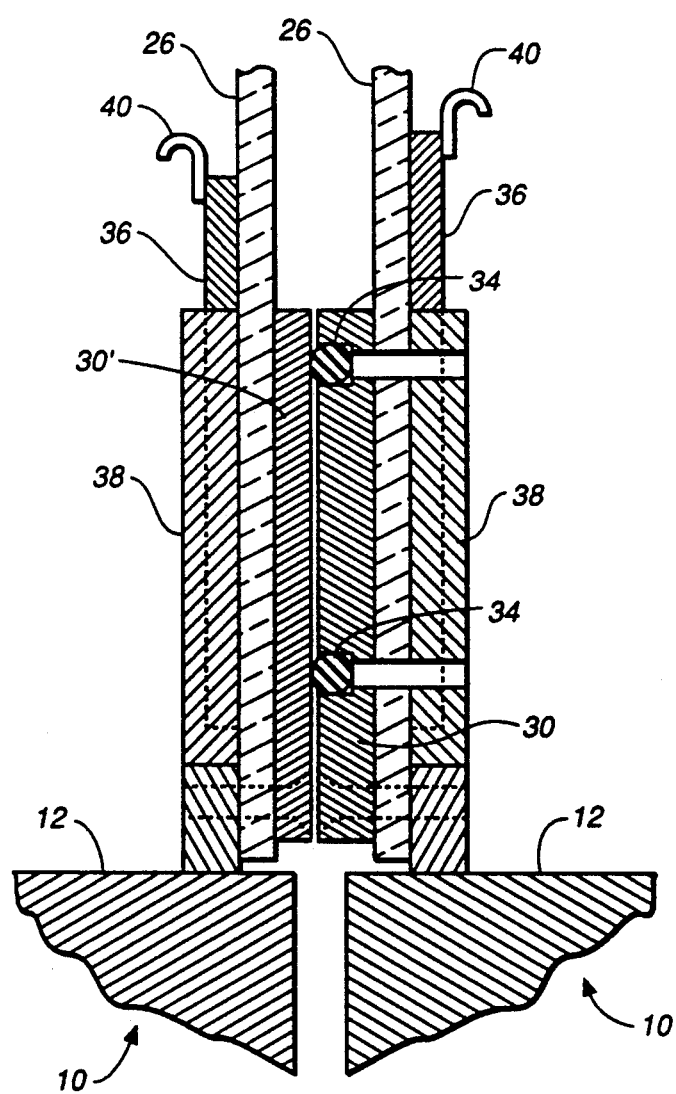
FIG._4

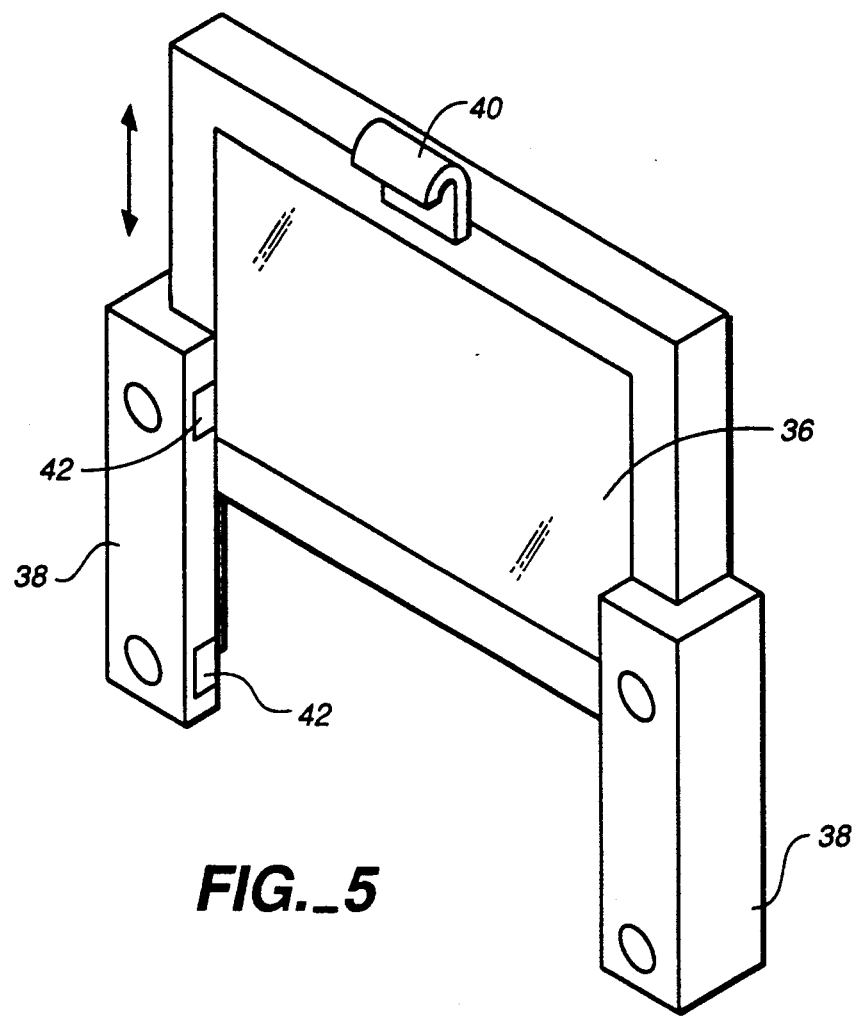
FIG._5
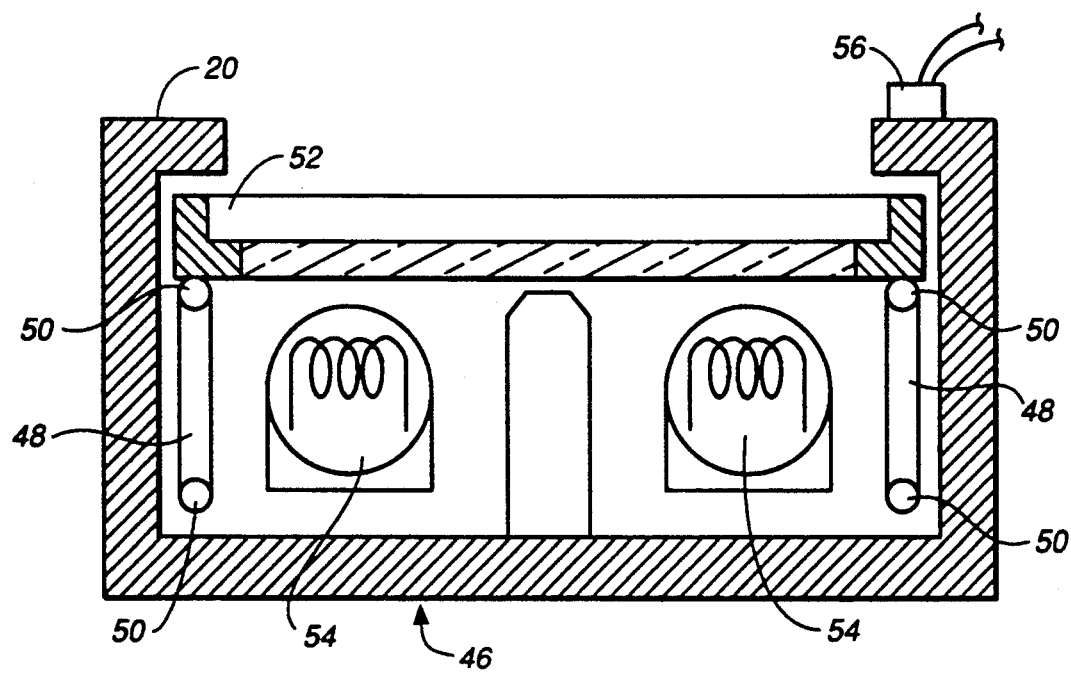
FIG._6

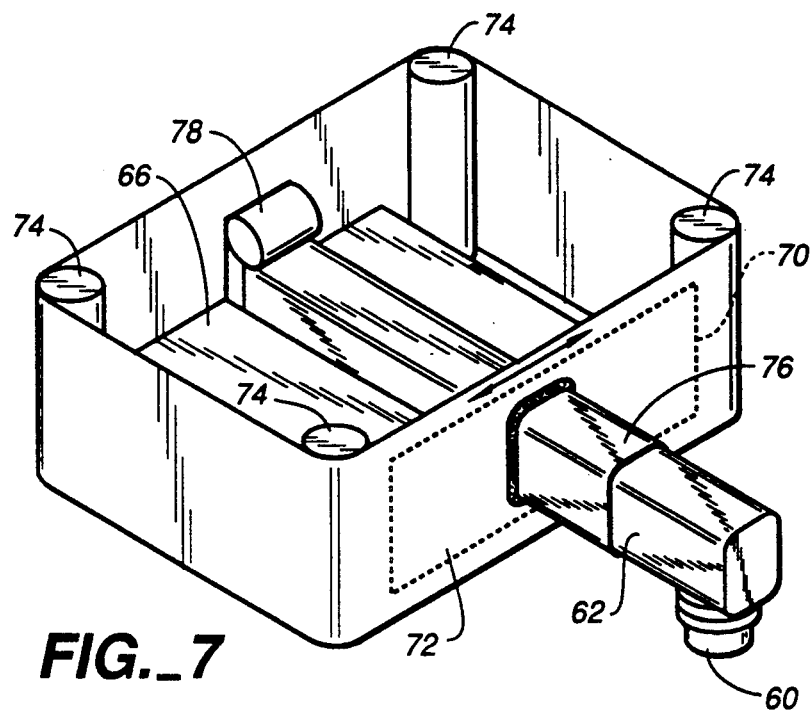
FIG._7
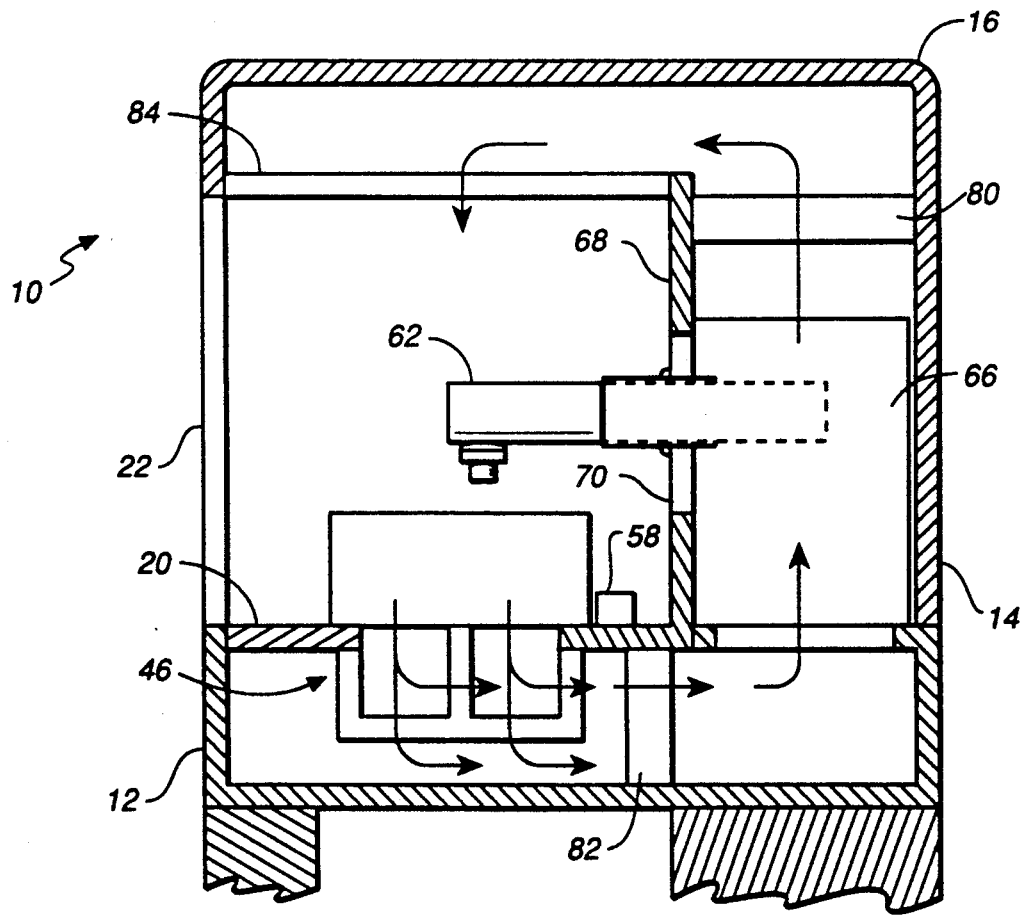
FIG._8

MODULAR CLEAN BENCH SYSTEM

BACKGROUND OF THE INVENTION

This invention relates to an efficiently operable modular system of clean benches which can be connected together in series such that objects on which various tasks are to be performed can be transported therethrough and the tasks can be carried out robotically within a clean-room environment.

A so-called clean room is commonly used for many production processes where a dust-free environment is essential, or at least highly desirable. A clean room is a sealed chamber into which clean air is constantly introduced and in which workers are normally required to wear a special dust-free outer garment. A clean room is generally large and is therefore relatively expensive to operate and to maintain in a dust-free condition. Since the air which has been circulated once is discharged out of the room and new supplies of external air are constantly being introduced, air filters become clogged quickly and must be exchanged frequently, and this also affects the operating cost of a clean room adversely. In addition, the protective garments required inside a clean room are generally uncomfortable to wear and tend to dishevel the wearer's hair.

In view of the above, so-called clean benches are sometimes substituted for use especially where the required space is not large. A typical prior art clean bench may be described as an ordinary work bench with an overhead outlet for filtered air such that a downward flow of clean air is established within a work space above the bench. With a clean bench thus formed, a worker is not required to wear any protective garment. Since such a clean bench does not provide any sealed enclosure, however, it can be useful only if the requirement for a dust-free environment is not so stringent. Since the downwardly circulated air is discharged thereafter and new supplies of external air must be introduced, the filters must still be exchanged frequently, although to a lesser degree because benches are much smaller than a room.

SUMMARY OF THE INVENTION

It is an object of the present invention to provide inexpensive means for accommodating a dust-free work space.

It is another object of the invention to provide such means for accommodating a clean-room environment of variable sizes.

It is a more specific object of the invention to provide a modular system of clean benches, any number of which can be connected in series.

It is another object of the invention to provide such a modular system of clean benches on which work can be carried out both robotically and manually inside a sealed enclosure.

The above and other objects can be accomplished by providing a modular system of clean benches particularly designed according to the present invention. The clean benches according to the present invention may be characterized firstly as providing a sealed work space and secondly as allowing any number of them to be connected together in a row such that objects can be transported on pallets from the sealed work space of one of them to that of another through a sealed doorway. Each bench is provided with conveyor belts and a driving means for a robotic gripper arm such that pallets loaded with objects can be transported concurrently backward and forward through the connected benches and various tools can be used to automatically perform different tasks on them. The main frame of each bench forms a closed air circulating system for the work space such that the circulated air remains clean for a relatively long time. Air circulating means such as fans for the air circulating system are so arranged that the air pressure tends to be higher in the work space that elsewhere. The pallets for carrying objects to be processed have a bottom made of a translucent material and are passed over a light source such as lamps such that the objects placed thereon can be more clearly visible from above.

BRIEF DESCRIPTION OF THE DRAWINGS

The accompanying drawings, which are incorporated in and form a part of this specification, illustrate an embodiment of the invention and, together with the description, serve to explain the principles of the invention. In the drawings:

FIG. 1 is a perspective view of a modular system of clean benches embodying the present invention when the benches are connected;

FIG. 2 is a perspective view of one of the clean benches of the system shown in FIG. 1;

FIG. 3 is a perspective view of a connector according to one embodiment of the present invention;

FIG. 4 is a sectional side view of the connector of FIG. 3 and components adjacent thereto;

FIG. 5 is a perspective view of a door and the guide pieces therefor taken from the interior of the work space of the bench unit of FIG. 2;

FIG. 6 is a schematic side sectional view of one of the conveyors shown in FIG. 2;

FIG. 7 is a perspective view of a robotic driving mechanism surrounded by a screening curtain for the bench unit of FIG. 2 for moving its gripper arm; and FIG. 8 is a schematic side sectional view of the clean bench unit of FIG. 2 to show its air circulation path.

DETAILED DESCRIPTION OF THE INVENTION

As shown in FIG. 1, a modular system of clean benches according to the present invention is characterized as having any number of identically structured individual clean bench units 10 which are disposed in a single row in a mutually side-by-side relationship and mutually connected together such that a dust-free, clean-room environment can be established within a work space of various sizes. Since the individual units 10 are identically structured, the structure of only one of these clean bench units 10 will be explained.

As shown in FIG. 2, an individual clean bench unit 10 according to the present invention has a main frame which, broadly described, is composed of a base part 12, a back part 14 and a ceiling part 16. The base part 12 includes not only legs 18 which support the entire bench unit 10 but also a bench top 20 which is its top surface where various tasks are intended to be carried out. The back part 14 is at the rear section of the unit 10 and serves to support the ceiling part 16 which extends horizontally above and over the bench top 20. The space in front of the back part 14 and between the bench top 20 and the ceiling part 16 is referred to as the work space.

In order to establish an airtight sealed enclosure of the work space, a cover piece 22 is detachably engaged with the main frame. For the aforementioned purpose, the cover piece 22 is generally U-shaped, being composed of a front wall 24 and side walls 26, the front wall 24 defining the frontal boundary of the work space and the side walls 26 defining its lateral boundaries. These walls 24 and 26 of the cover piece 22 are made of a transparent material such as glass such that whatever process that is going on within the sealed enclosure of the work space can be readily observable from outside. In order to enable a user to reach the interior of the work space, two openings are provided on the front wall 24, airtightly fitted with gloves 28. The side walls 26 are each provided with a generally rectangular opening and a connector 30 (or 30') surrounding this opening for connecting two of the units 10 together such that not only can objects be transported back and forth therethrough between the mutually adjoining pair of units but also the interiors of the two connected units 20 can together form a larger, jointly sealed work space.

With reference next to FIGS. 3 and 4, the connector 30 on one side according to one embodiment of the present invention may be characterized as being a frame-like structure with an annular groove 32 into which an 0-ring 34 is inserted and being attached to one of the side walls 26 of the cover piece 22 around its opening. The connector 30' on the opposite side wall 26 is similarly structured but without a groove such that an airtight connection can be established as shown in FIG. 4.

As shown in FIG. 5, the opening in each of the side walls 26 is provided with a door 36. A pair of cross-sectionally L-shaped guide pieces 38 is attached to the inner surface of each side wall 26 along the vertical edges of the generally rectangular opening therein such that the door 36 can be moved vertically up and down as indicated by a double-headed arrow in FIG. 5 by sliding against the wall 26 along the guide pieces 38. When the door 36 is completely lowered, the opening in the corresponding side wall 36 is completely closed in an airtight manner such that the work space behind the cover piece 22 remains sealed. The door 36 is provided with an inwardly protruding handle piece 40 such that an operator can reach it by hand through one of the openings on the front wall 24 and the glove 28 attached thereto so as to manually lift the door 36. Magnets 42 are provided on one of the guide pieces 38 at different heights such that the door 36 can be magnetically caused to remain at a lifted position or at the lowered position. If the door at the opposite opening on the adjoining unit is similarly opened, the connectors 30 and 30' which are airtightly joined together as shown in FIG. 4 provide a sealed passage between the two units, as explained above.

In FIG. 2, numeral 44 generally indicates a transporting system laterally extending between the two openings on the side walls 26. According to a preferred embodiment of the invention, the transporting system 44 consists of two conveyors 46 extending parallel to each other such that one set of objects can be transported in one direction while another set of objects can be transported in the opposite direction. As shown sectionally in FIG. 6, Each conveyor 46 includes two sets of pulleys 48 and belts 50 which are each stretched between a set of these pulleys 48. Objects to be transported from inside one of the clean bench units 10 serially connected as shown in FIG. 1 to the interior of the next unit (as well as within the same unit) are placed on top of a pallet 52, which is generally rectangular in shape and has bottom made of a translucent material. Lamps 54, serving as a light source, are provided below the level of the bench top 20 between the two belts such that the objects placed on the pallet 52 are silhouetted and hence more distinctly visible from above as they are transported on the belts 50 as shown in FIG. 6. In FIG. 6, numeral 56 indicates a sensor for detecting the position of the pallet 52 along the path of the conveyor 46.

In order to automatically carry out various tasks on the objects being transported on the pallet 52, each clean bench unit 10 is provided with a set of tools 58 and a gripper 60 near the front end of a forwardly extending gripper arm 62 as shown in FIG. 2 for gripping one or more of these tools 58 to perform various tasks. In FIG. 2, numeral 64 indicates a tool stand for placing the tools 58 thereon at preassigned positions.

The gripper 60 can be moved three-dimensionally, and its motion is controlled by a robotic driving mechanism broadly indicated at 66 in FIG. 7. The structure of this mechanism 66 will not be described in detail because a similar mechanism has already been described in the U.S. patent application Ser. No. 07/525,338 filed May 17, 1990, which will be herein incorporated by reference.

Except for the forwardly protruding part of the gripper arm 62 including the gripper 60, the robotic mechanism 66 is substantially entirely housed inside the back part 14 of the main frame. As shown in FIG. 2, the back part 14 of the main frame has a front wall 68 which serves as the back boundary of the sealed work space defined between the ceiling part 16 and the bench top 20. The front wall 68 has a horizontally elongated opening 70 through which the gripper arm 62 protrudes forwardly into the work space from the robotic mechanism 66 controlling its motion. In order to prevent air from passing through this opening 70, there is provided a horizontally elongated screening curtain 72 which is stretched in a rectangular form around four vertical rollers 74 and clamped to a horizontally supported shaft 76 as shown in FIG. 7. Although hidden behind the curtain 72 and not visible in FIG. 7, these vertical rollers 74 are supported by a bracket which also supports thereon a laterally extended rail. The shaft 76 is supported by this rail and is adapted to slide laterally therealong as indicated by double-headed arrow in FIG. 7, while maintaining its forward-backward direction. A servo motor (not shown) is dedicated to this lateral motion of the shaft 76, and another servo motor 78 fastened to the shaft 76 serves to control the forward-backward motion of the gripper arm 62 through the shaft 76. As the shaft 76 is thus moved laterally, the curtain 72 is accordingly pulled sideways and moves around the rollers 74. The robotic driving mechanism 66 also includes still another servo motor (not shown) for vertically moving the aforementioned bracket which supports not only the four rollers 74 supporting the curtain 72 but also the laterally extended rail along which the shaft 76 is adapted to travel. As this servo motor is activated to raise or lower the bracket, both the shaft 76 and the screening curtain 72 move vertically together. The height (vertical extension) of the screening curtain 72 is determined according to the height of the opening 70 and the range of allowed vertical motion of the shaft 76 (and also that of the gripper arm 62) such that the opening 70 remains covered by the screening curtain 72 no matter where the shaft 76 has been moved laterally and/or vertically by the driving mechanism within the confine of the opening 70.

Another important feature of the present invention is illustrated in FIG. 8 which is a schematic side sectional view of one of the bench units 10, showing that the base part 12, the back part 14 and the ceiling part 16 of the main frame are internally connected to together form one continuous air path opening to the work space in front of the back part 14 both through openings on the lower surface of the ceiling part 16 and in the base part 12 of the main frame as schematically shown in FIG. 8. Two sets of fans 80 and 82 are disposed in this path, a set of fans 80 disposed near the ceiling part 16 serving to circulate the air into the work space downward from the interior of the ceiling part 16 and a fan 82 disposed in the base part 12 serving to draw the air from the work space into the base part 12. These fans 80 and 82 together serve to circulate air within the unit 10 in the direction indicated by the arrows in FIG. 8. Thus, if there is an accidental leak of air while the fans 80 and 82 are being operated, the resultant air motion will be outward and away from the work area. This serves to prevent dust-containing, unfiltered external air from reaching the work space where a clean-room environment is particularly desirable. In FIG. 8, numeral 84 indicates a HEPA (High Efficient Particle Arrester) filter, say, of class 100 (allowing less than 100 particles of sizes greater than 0.5 microns per cubic foot). It goes without saying that an ULPA (Ultra Low Particle Arrester) of class 10 (allowing less than 10 particles of sizes greater than 0.3 microns per cubic foot) may be substituted, depending on the circumstances.

After a plurality of clean benches 10 thus structured are connected in series as shown in FIG. 1, and the partitioning doors 36 are all opened, there results one continuous, elongated clean room in which a clean-room environment can be maintained efficiently because there is no need to keep introducing new supplies of dust-containing external air. A succession of mutually aligned conveyor belts 50 serves to transport objects to be processed on pallets from one unit to the next, starting from an initial location indicated by numeral 86 in FIG. 1. Many kinds of routine production tasks can be efficiently and accurately performed by robotically operated arms and a large number of selected tools, but manual operations are also permitted without adversely affecting the clean-room environmental condition. After all desired tasks are completed on the objects on a pallet, they are returned to the initial location 86 on another succession of serially aligned conveyor belts 50. The existence of two lines of conveyor belts 50 in the transportation system 44 allows some of the pallets 52 to move in one direction while the others move in the opposite direction to improve efficiency. Needless to say, any number of units 10 can be connected together and any number of tasks can be performed inside each unit. The user may find it more efficient to use a larger number of units, each unit performing fewer tasks. The present invention presents a freedom of choice in such work assignment among the individual units besides improving the work efficiency of individual units. Although the operations of a serially connected plurality of units as well as those of the individual units are intended to be controlled by a central processing system, such control systems are well known to persons skilled in the art. In the description herein, such a control system is only schematically indicated at 90 in FIG. 1. It is additionally to be noted that the bench units 10 of the present invention can be used also as ordinary work benches if the cover pieces 22 are removed from the main frames.

The present invention has been described above by way of only one illustrative example, but this example is not intended to be interpreted as limiting the scope of the invention. Many modifications and variations are possible within the scope of the invention. For example, the connectors 30 and 30' described above may be substituted by another kind of connectors using bellows. The doors 36 may be made openable automatically instead of manually, or horizontally instead of vertically. In other words, all such modifications and variations that may be apparent to a person skilled in the art are intended to be included within the scope of this invention.

What is claimed is:

1. A modular clean bench system with a plurality of mutually connectable individual units each comprising:
   a main frame which includes a base, a back part and a ceiling part, said base having a top surface, said back part extending upward from said top surface, said ceiling part being supported by said back part and disposed above and over said top surface such that said top surface and said ceiling part define a work chamber therebetween and in front of said back part;
   a cover piece having a front wall and side walls extending between and sealingly engaging with both said base and said ceiling part so as to seal said work chamber and to thereby serve as the frontal and lateral boundaries of said sealed work chamber, said side walls being provided with side openings and corresponding doors which can open and airtightly close said side openings; and
   connecting means at said side openings, each for being detachably attached sealingly to another one of said connecting means on another of said individual units such that the sealed work chambers of said mutually attached units are connected to each other while remaining sealed and objects can be transported back and forth therebetween.

2. The system of claim 1 wherein said cover piece is transparent and said front wall is provided with at least one opening airtightly connected with a glove such that a user can reach said doors through said glove and open and close said door manually from inside said work space.

3. The system of claim 2 wherein said cover piece is detachable from said main frame.

4. The system of claim 1 further comprising an air circulation path formed through said main frame for circulating air from an inlet in said base through said back part to an outlet in said ceiling part.

5. The system of claim 4 further comprising first air circulating means for pushing air from said path into said work space through said outlet and second air circulating means for sucking air from said work space through said inlet into said path so as to establish a circulating air flow through said work chamber and said air circulation path.

6. The system of claim 1 wherein said connecting means include an O-ring and supporting means attached around said side opening for supporting said O-ring between said two units.

7. The system of claim 1 further comprising guiding means attached to said side walls for guiding said doors as said doors are lifted.

8. The system of claim 7 wherein said guiding means include magnets affixed thereto, said magnets serving to exert magnetic force on said doors such that, when said doors are in lifted positions, said doors are prevented from sliding down along said guiding means and tend to remain in said lifted positions.

9. A modular clean bench system with a plurality of mutually connectable individual units each comprising:
   a main frame which includes a base, a back part and a ceiling part, said base having a top surface, said back part extending upward from said top surface, said ceiling part being supported by said back part and disposed above and over said top surface such that said top surface and said ceiling part define a work chamber therebetween and in front of said back part;
   a cover piece having a front wall and side walls extending between and sealingly engaging with both said base and said ceiling part so as to seal said work chamber and to thereby serve as the frontal and lateral boundaries of said sealed work chamber, said side walls being provided with side openings and corresponding doors which can open and airtightly close said side openings;
   connecting means at said side openings, each for being detachably attached sealingly to another one of said connecting means on another of said individual units such that the sealed work chambers of said mutually attached unit are connected to each other while remaining sealed and objects can be transported back and forth therebetween; and
   a pair of conveyors extending laterally on said top surface of said base between said side openings for transporting thereon objects received through either of said side openings.

10. The system of claim 9 further comprising a pallet for carrying objects thereon and being placed on one of said conveyors to transport said objects therealong from one to another of said units.

11. The system of claim 9 further comprising a light source disposed below said top surface of said base and said pallet has a bottom made of a light-transmissive material.

12. The system of claim 9 further comprising an air circulation path formed through said main frame for circulating air from an inlet in said base through said back part to an outlet in said ceiling part.

13. The system of claim 9 wherein said connecting means include an O-ring and supporting means attached around said side opening for supporting said O-ring between said two units.

14. The system of claim 9 further comprising guiding means attached to said side walls for guiding said doors as said doors are lifted.

15. A modular clean bench system with a plurality of mutually connectable individual units each comprising:
   a main frame which includes a base, a back part and a ceiling part, said base having a top surface, said back part extending upward from said top surface, said ceiling part being supported by said back part and disposed above and over said top surface such that said top surface and said ceiling part define a work chamber therebetween and in front of said back part;
   a cover piece having a front wall and side walls extending between and sealingly engaging with both said base and said ceiling part so as to seal said work chamber and to thereby serve as the frontal and lateral boundaries of said sealed work chamber, said side walls being provided with side openings and corresponding doors which can open and airtightly close said side openings;
   connecting means at said side openings, each for being detachably attached sealingly to another one of said connecting means on another of said individual units such that the sealed work chambers of said mutually attached units are connected to each other while remaining sealed and objects can be transported back and forth therebetween;
   a gripper;
   an elongated gripper arm supporting said gripper; and
   a mechanism for controlling the motion and operation of said gripper and said gripper arm, said mechanism being contained mostly inside said back part, said back part having a horizontally extending front opening, said gripper arm extending forward from said mechanism and out of said back part into said work chamber through said front opening.

16. The system of claim 15 further comprising a screen which is attached to said gripper arm so as to move vertically and laterally therewith and is adapted to keep said front opening of said back part airtightly closed independently of lateral or vertical motion of said gripper arm limited by said front opening.

17. The system of claim 15 further comprising a tool stand on said top surface of said base and tools to be exchangeably gripped by said gripper, said tools being disposed at specified positions on said tool stand.

18. The system of claim 15 further comprising an air circulation path formed through said main frame for circulating air from an inlet in said base through said back part to an outlet in said ceiling part.

19. The system of claim 15 wherein said connecting means include an O-ring and supporting means attached around said side opening for supporting said O-ring between said two units.

20. The system of claim 15 further comprising guiding means attached to said side walls for guiding said doors as said doors are lifted.

* * * * *